United States Patent [19]

Wong

[11] 4,167,431
[45] Sep. 11, 1979

[54] METHOD OF HEAT LAMINATION AND LAMINATED PRODUCT

[75] Inventor: Tony K. M. Wong, Islington, Canada

[73] Assignee: Morgan Adhesives Company, Stow, Ohio

[21] Appl. No.: 547,587

[22] Filed: Feb. 6, 1975

[51] Int. Cl.² .............................................. B29D 7/02
[52] U.S. Cl. ................................. 156/244.11; 156/321; 264/178 R
[58] Field of Search ............... 156/244, 282, 321, 332, 156/500; 264/45.1, 45.9, 46.2, 46.4, 178 R, 180, 233, 237, 348; 428/304, 315, 320

[56] References Cited
U.S. PATENT DOCUMENTS

| | | | |
|---|---|---|---|
| 3,219,733 | 11/1965 | Harris et al. | 264/178 R |
| 3,227,603 | 1/1966 | Kraiman | 156/321 |
| 3,496,262 | 2/1970 | Long et al. | 264/178 R |
| 3,616,020 | 10/1971 | Whelan et al. | 156/244 |
| 3,619,344 | 11/1971 | Wolinski | 156/282 |
| 3,620,898 | 11/1971 | Harris et al. | 156/244 |

*Primary Examiner*—Caleb Weston
*Attorney, Agent, or Firm*—Oldham, Oldham, Hudak & Weber Co.

[57] ABSTRACT

An in-line method of forming a laminate of a heat sensitive foam sheet material, and a hot extruded polymeric product comprising hot extruding a polymeric material into a shaped product and while still hot contacting the shaped product with a face of the heat sensitive foam sheet material and thereafter cooling the resulting product. Such face is previously coated with a layer of a heat sealing substance which is activated at a temperature below the softening point of the heat sensitive foam sheet. The heat seal contact takes place under minimal pressure when the surface temperature of the shaped product is still high enough to activate the heat sealing substance but not high enough to damage the heat sensitive sheet. The laminates so made are part of the invention.

4 Claims, 5 Drawing Figures

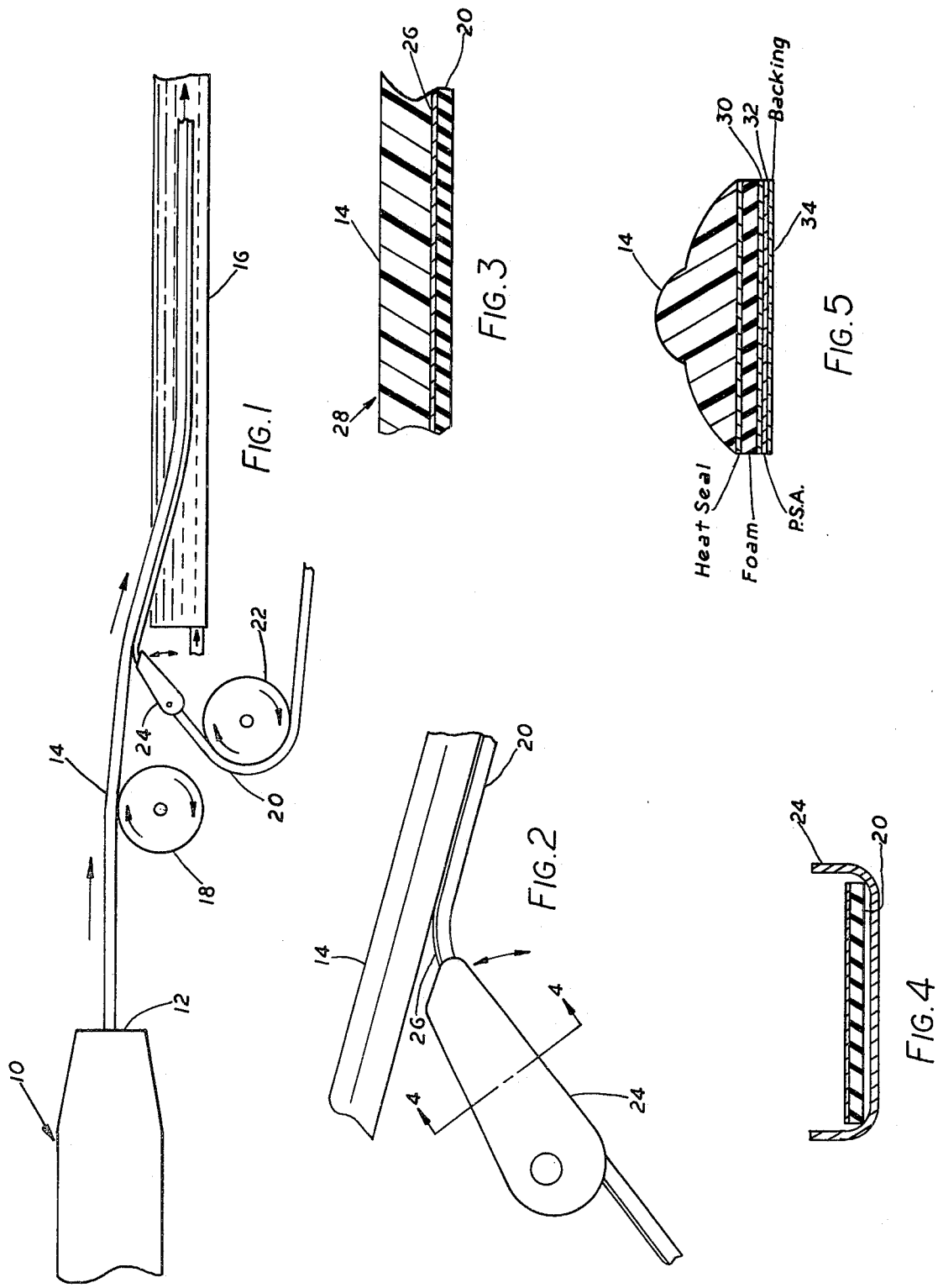

METHOD OF HEAT LAMINATION AND LAMINATED PRODUCT

This invention relates to a method of forming laminates and particularly to a method of forming laminates having a heat sensitive foam layer therein and to the resulting product.

BACKGROUND OF THE INVENTION

Extruded plastic profiles for decorative and protective purposes such as side trims for automobiles, decorative trims for appliances and the like, have achieved considerable commercial success. These profiles could be bolted on or secured by clips or attached by contact cement or sealant compounds to various substrates. These methods of fastening are tedious, laborious and may damage the substrates to which the profiles are attached. Recently, foam tapes coated both sides with a pressure-sensitive adhesive such as "Macmount 9632" (trademark) or "Macmount 9760" (trademark) from Morgan Adhesives Company have been used in practice. Foam tapes as a means of fastening are extremely easy to apply and have many other advantages. Such foam tapes are highly conformable and fasten the profiles well to even curved or rough surfaces. They also absorb shock and do not damage the substrates.

Other ways of making laminates are also known. For instance, laminates of polyester foams to plastics can be made by means of adhesive or heat either in their finally cured state or by a polyester foam formed in situ in contact with a preformed plastic film. It is also taught in Canadian Pat. No. 564,307 issued Oct. 7, 1958, to Wilson et al, that polyesterdiisocyanate foams can be united before the film is completely cured, that is by combining a foamed product to an incompletely cured polyvinyl chloride in the form of a plastisol or organol. It is also taught in Canadian Pat. No. 828,134 issued Nov. 25, 1969, to Laberinti et al to weld foam polyurethane to a layer of vinyl resin by means of high frequency welding.

Most polymeric substances are difficult to adhere to because they usually contain a substantial amount of migrating substances such as low molecular weight materials, such as plasticizers, stabilizers, extenders, extrusion aids and the like which may bleed to their surfaces, making them very poor surfaces to bond to. Thus, if an extrudate is allowed to age for any appreciable length of time before a tape is applied to it, low molecular weight materials as described above may migrate to the surface of the extrudate making it a very difficult surface to adhere to. These low molecular weight materials may also migrate from the extrudate into the pressure-sensitive adhesive in contact with it on aging. Hence, even if a good initial bond is formed, the bond may degrade on aging because of these migrating substances. This may cause the pressure-sensitive adhesive to suffer severely in cohesive strength or may impair the adhesion between the adhesive and the extrudate or between the adhesive and the foam.

Moreover, a good bond between the pressure-sensitive adhesive on the foam tape and the plastic profile is difficult to achieve.

Migration is a well known problem with this type of product using pressure-sensitive adhesive and different manufacturers are taking various steps to try to reduce the effects of such migration. The usual means for reducing the rate of migration is by the use of a barrier film or coating, or by chemically treating the surface of the migratory component. Another method involves balancing the amount of low molecular weight material like plasticizers in the adhesive and in the extrudate so that the rate of migration of plasticizers from the adhesive to the extrudate is equal or nearly equal to the rate of plasticizer migration from the extrudate to the adhesive. All these methods are not completely satisfactory and it may be only a matter of time for the bond to fail.

The general object of the invention is to avoid and overcome the foregoing problems and form a laminate having a good bond between the layers thereof by a heat sealing or bonding action.

Another object of the invention is to provide a method of bonding a hot polymeric extrusion to a heat sensitive polymeric foam by a heat bonding layer and by low pressure.

Other objects of the invention will be made apparent as the specification proceeds.

SUBJECT MATTER OF THE INVENTION

Broadly stated, the present invention comprises a method of forming a laminate of a heat sensitive foam sheet material and a hot extruded polymeric product comprising the steps of hot extruding a polymeric material into a shaped product, and while still hot contacting said shaped product with a face of the foam sheet material, said face being coated with a layer of a heat sealing substance which is activated at a temperature below the softening point of said heat sensitive foam sheet, said contact producing adherence of said shaped product to said sheet, said contact taking place when the surface temperature of the shaped product is still high enough the activate the heat sealing substance but not high enough to damage said heat sensitive foam sheet, and then cooling the resulting laminate below the activation temperature of the heat sealing substance.

The invention also comprises a laminate comprising a polymeric extrudate heat sealed to a polymeric foamed sheet material by a heat sealing material. The said heat sealing substance generally provides a long life bond between the various layers in the laminate and retards the rate of migration of migratory substances as referred to above.

In a preferred embodiment of the invention, there is provided a method adapted to the formation of a laminate of a polymeric foam sheet material and a polymeric extrusion, comprising the step of feeding one face of the foam layer to the extrusion for adhesion thereto, said face of said foam layer having a heat sealing coating which is activated at a temperature below the softening point of the foam, said foam layer being fed to the extrusion when the surface temperature of the extrusion is high enough to activate the heat sealing coating without damaging the foam layer.

In another embodiment there is provided a continuous method for an in-line forming of a laminate of a polymeric foam sheet material and a polymeric extrusion comprising continuously forming a hot polyvinyl chloride extrusion, continuously unwinding a closed cell foam layer of polyvinyl chloride, said foam layer having a face coated with a high molecular weight polymethyl methacrylate, and continuously contacting said face with said extrusion without external pressure during a period of time and at a temperature sufficient to activate sealing or bonding action of the polymethyl methacrylate without damaging said foam layer and thereby obtaining a laminate, and immediately thereafter cooling the laminate in a water bath to prevent damage of the foam layer.

Referring now to the drawings which illustrates a preferred way of carrying out the invention:

FIG. 1 is a diagrammatic view of apparatus used to carry out the invention;

FIG. 2 is an enlarged detail elevation, partly in section, showing the formation of the laminate;

FIG. 3 is a cross sectional view of the resulting laminate;

FIG. 4 is a vertical section through the guide mechanism or feeder of FIG. 2; and FIG. 5 is a vertical cross section through a laminate of the invention.

In the structure shown in the accompanying drawings, the thicknesses of the various layers thereof are exaggerated and are not shown in any direct proportion to each other. Normally the layers of pressure sensitive adhesive, heat seal layers, barrier layers, backing, etc are quite thin, such as only about 0.0005 to 0.006 inch thick.

When referring to corresponding members shown in the drawings and referred to in the specification, corresponding numerals are used to facilitate comparison therebetween.

In the drawings, the numeral 10 designates a conventional extruder containing a polymeric product which is softened or molten and emerges at the orifice 12 as a hot flexible plastic extrudate 14 that is guided to a cold water bath 16 by a guiding wheel 18.

Near the extruder 10, a coated heat sensitive foam layer 20, guided by or stored on a roll 32, is fed into and through a suitable feeder 24 as shown in FIG. 2. The feeder is in such spaced relationship to the extrusion 14 as to enable contact of a layer or coating 26 on the sensitive layer 20 with the hot extrudate 14 and thereby bonding of the heat sensitive layer 20 to the hot extrudate 14 by the sealing substance 26 to form a laminate 28 as shown in FIG. 3. The heat required for bonding is obtained from hot extrudate 14. No substantial or external pressure is exerted on the layers for making the laminate 28. The laminate is thereafter immediately deposited in and rapidly cooled by the water bath 16 to prevent degradation of the heat sensitive foam layer 20. It should be noted that the heat sensitive layer is only very briefly exposed to the hot extrudate and then only through the layer 26. Thus this process prevents damage to or the destruction of the heat sensitive layer, and in particular when said layer is a foam.

There are a plethora of extruded polymeric layers that may be used in practice of the invention, and by way of example only, the following will be given: polyethylene, polypropylene, and other melt extrusion polymers, including polyvinyl chloride compounds such as Geon M606 (trade mark) and Geon M607 (trade mark) and Geon 6411 (trade mark) by B. F. Goodrich Company or R1810 (trade mark) sold by Carlew Chemicals, and the like. Among the heat sensitive sheet materials, the preferred ones are flexible foams such as polyethylene, polypropylene, neoprene, polyurethane, polyvinyl chloride and the like and more preferably closed cell foams.

As it is highly desirable to have a continuous layer of skin on the surface of the heat sensitive foam so that the foam can be coated effectively, the foam preferably is made by casting. For example, a polyvinyl chloride foam may be made by casting a conventional organosol or plastisol containing the polyvinyl chloride, blowing agent, plasticizers and other additives onto a casting paper or surface blowing said compound and heat curing it to form the layer of foam with a surface skin. A typical material is Fabrelle X31 from Stauffer Chemical Company. As a way of example, the softening point of such a foam may be in the range of about 270° F.

The heat sealing substances that may be used are generally chosen from thermoplastic polymeric materials, and they include, for instance: copolymers of ethylene and vinyl acetate e.g. Elvax from Du Pont Company, copolymer of vinyl chloride and vinyl acetate e.g. Bakelite VYHH from Union Carbide, polyurethanes e.g. Estane 5712 from B. F. Goodrich, polyester resins e.g. 49000 from Du Pont, acrylic resins e.g. Acryloid from Rohm and Haas and blend of nitrile rubber e.g. Krynec 3450 from polysar and phenolic resin e.g. Durez 11078 from Hooker Chemical Corporation. The choice of the heat seal or bond material depends on the compatibility with the extrusion compound and the foam compound. The heat sealing or bonding temperature of this coating 26 must be lower than the softening point of the foam material.

Preferred bonding materials are polymethyl methacrylate, such as Elvacite 2101 (trade mark) and Elvacite 2041 (trade mark) by E. I. Du Pont Company, which have excellent barrier properties against migration and which can be heat sealed or bonded to the strip 14 for instance at a temperature as low as 195° F.

In order to improve the compatability of polymethyl methacrylate with polyvinyl chloride foam, a copolymer of polyvinyl chloride-vinyl acetate, such as "Bakelite VYHH" (trade mark) by Union Carbide, can be included in the heat sealing or bonding adhesive formula. These resins are dissolved in a solvent such as methyl ethyl ketone to form a solution for ease of coating onto the foam material or strip 20.

The following will serve to illustrate an embodiment of one substance used in practice of the invention.

EXAMPLE 1

| LAYER 26 | | |
| --- | --- | --- |
| Elvacite 2041 (trade mark) | 70–90 | 70 parts |
| Elvacite 2010 (trade mark) | 10–90 | 10 parts |
| Bakelite VYHH (trade mark) | 20–30 | 20 parts |
| Methyl Ethyl Ketone | | 400 parts |

The heat substance such as shown in Example 1, has the ingredients thereof suitably mixed and then it is coated onto one surface of a strip or layer of a flexible polyvinyl chloride foam and dried at around 120° F. The foam usually is between about 0.020 and 0.12 inches thick. The coated foam sheet is then slit down to various widths according to the widths of extrudate to be laminate to.

The polyvinyl chloride compound is fed into a standard plastic extruder with the die temperature set at around 330° F.

The coated foam is then laminated to the extrudate just prior to the cooling bath. The coated surface of the foam is allowed to or is moved or positioned to come into contact under minimum pressure with the extrudate, which would have a surface temperature of around 250° F. at that point (see FIG. 2). The whole laminate is then quickly cooled by promptly leading it to or immersing it in or under running cold water to "set" to its final shape and also to prevent damage of the foam because of heat.

The bond between the foam and the extrudate formed this way was found to be excellent and it did not break down appreciably even after long term aging.

This is also suitable for making a "pressure-sensitive adhesive tape backed plastic extrudate product". The manufacture of this type of product would involve an additional coating operation of the foam before being laminated to the extrudate. For example, a pressure-sensitive adhesive such as "Gelva 263" (trade mark) by Monsanto Chemical Company, may be used.

As it can be seen the present invention enables cost reduction insofar as the coating of a pressure-sensitive adhesive on one side of the foam is eliminated. It also reduces cost by eliminating the extra process of putting a barrier film or coating on the extrudate. Furthermore, if desired, it allows an in-line lamination process which enables the whole manufacturing operation of this type of tape backed extrudate to be much streamlined and made more efficient.

In order to complete the laminate from the structure 28 as shown in FIG. 3, normally a conventional barrier layer 30, as taught in U.S. Pat. No. 3,549,452, issued Dec. 22, 1970, is provided and deposited on the exposed surface of the foam layer or sheet 20. Additionally, then a conventional layer of pressure sensitive adhesive 32 is deposited on the barrier layer 30 and a removable backing sheet, such as one made from paper 34 is temporarily applied to the pressure sensitive adhesive layer. Thus, a flexible laminate has been provided especially suitable for use as an auto trim strip wherein a good permanent bond relation is set up between the extrudate 14 and its anchoring or adhesive means.

It should be realized that any conventional means can be used for securing the feeder 24 in position so that the angular relationship of such feeder to the extrudate can be varied for gentle contact between the foam layer 20 and its bonding coating 26 thereon with the lower surface of the extrudate. Such laminate is moving so that it is only a short time from the laminating action until the laminate is deposited into the water bath 16. Such bath has any suitable supply of cold water or other cooling means at room temperature provided therefor.

The die temperature for the extruder 10 usually is about 340° F. and the extrudate 14 when contacting the layer 26 was at about 250° F. Contact of the hote extrudate with the layer 26 provides immediate adhesive bonding of the two strips by the flat continuous contacting surfaces. Prompt cooling in the water bath of the resultant laminate provided the desired product.

Hence, the objects of the invention are achieved.

While one complete embodiment of the invention has been disclosed herein, it will be appreciated that modifications of this particular embodiment of the invention may be resorted to without departing from the scope of the invention.

What is claimed is:

1. A method of forming a laminate of a flexible polymeric foam and a polymeric extrusion, comprising the steps of feeding a hot polymeric extrusion from an extruder along a path to a cooling area and a continuously changing portion of the extrusion is not directly supported in such movement, moving the foam layer into physical contact with said portion of the extrusion for adhesion thereto prior to moving to the cooling area, said foam layer having a heat sealing coating which is activated at a temperature below the softening point of the foam, said foam layer being fed to the extrusion when the surface temperature of the extrusion is high enough to activate the heat sealing coating without softening the foam layer.

2. A method of forming a laminate as in claim 1 and comprising the step of feeding the extrusion through a gradually descending controlled path towards a cooling bath provided at the cooling area and moving said foam layer into gentle physical contact without external pressure with the lower surface of said portion of said polymeric extrusion to laminate said foam layer and polymeric extrusion only by said contact.

3. A method as in claim 2 and including the extrusion drawing the coated foam layer with it as the extrusion moves towards the cooling bath.

4. The method of forming a laminate as in claim 3 wherein said extrusion comprises hot polyvinyl chloride and the closed-cell foam layer is at ambient temperature and comprises vinyl chloride having a heat seal coating of high molecular weight polymethyl methacrylate thereon and bonding the foam layer to the extrusion by the polymethyl methacrylate without damaging said foam layer, and promptly thereafter cooling said laminate to prevent damage of said foam layer.

* * * * *